INVENTORS
Mearick Funkhouser
Jack W. Savage
BY Albert H. Reuther
THEIR ATTORNEY

INVENTORS
Mearick Funkhouser
Jack W. Savage
BY Albert H. Reuther
THEIR ATTORNEY

United States Patent Office 3,005,109
Patented Oct. 17, 1961

3,005,109
POWER SUPPLY INTERLOCK SYSTEM
Mearick Funkhouser, Dayton, and Jack W. Savage, Centerville, Ohio, assignors to General Motors Corporation, Detroit, Mich., a corporation of Delaware
Filed June 20, 1960, Ser. No. 37,361
9 Claims. (Cl. 307—34)

This invention relates to a method and means for control of power supply and, particularly, to utilization of available power for energization of multiple loads such as of domestic appliances including hot plates, griddles, coffee makers, toasters, waffle irons, mixers, vacuum sweepers and the like, as well as electric stoves or ranges having components such as surface units for a skillet, frying pan, deep well, as well as an oven and the like to be operated two or more from a single source of power though at most two can be energized at one time without overload of available supply lines at any particular moment of operation.

An object of this invention is to provide a new and improved control means for electrical appliances such as used in a home, apartment house and the like where generally one source of power such as 110–120 volts is available in a circuit fused for a predetermined maximum value such as 15 amperes yet where two or more appliances can be connected to a supply line and more than two together require in excess of predetermined maximum load current for starting though during operation any pair can be energized at a load current totaling less than maximum value which avoids overload of available supply lines at any particular moment of operation.

Another object of this invention is to provide a domestic-appliance energization control means having power supply to multiple outlets so interlocked electrically, mechanically, and the like such that at most only two outlets can be energized preferentially at any one time from a common source and one or more remaining outlets are subsequently energized subject to circuit control by means of potential coils, current relays and the like, each outlet optionally having light-indicator means to indicate which thereof is energized at a particular moment, and having load current thereof controlled thermostatically.

Another object of this invention is to provide a household appliance such as a stove, electric range and the like to have a power supply box portion connected to a main source of line voltage without any special wiring line and including an electrical circuit provided with electromagnetic switching means to establish connection for energization variously of such loads as surface units including one for quickly attaining high heat for cooking identifiable as "surge heat," another identifiable as a "heat-maintainer" that preheats and then automatically maintains a selected temperature thermostatically, a further unit identifiable as a "deep well" that can be used for deep frying of foods such as french fried potatoes, shrimps and the like as well as an oven for baking, broiling and the like having a unit which can be set to attain and maintain a predetermined heat all in predetermined sequence at most energizable simultaneously in pairs where heating is required most though adapted to shift energization automatically by interlock of relay means such that less preferential electrical loads can also be energized at least in a pulse-like operation to satisfy overall minimum power requirement where not all power or current is required at one time for heating without overload of the main source of line voltage, thus automatically to protect any fuse protector for the main source.

A further object of this invention is to provide control to guard against unnecessary functioning of an overload protector such as fuse means per se by having a power supply box portion including a housing for electromagnetic relay means, including switch arms electrically interconnected with respect to others by predetermined wiring means energizable in part in a preferential and selective manner for power supply to thermostatically controlled load means such as a coffee maker, toaster, waffle iron and the like, the total wattage of which would require in excess of current rating for a fuse protector of the power supply though once up to operating temperature it is possible to maintain sufficient heating by intermittent preferential energization of total load still without damage to an overload protector such as fuse means.

Another object of this invention is to provide a power distributor including a terminal board and circuit having a plurality of multi-arm electromagnetically operated relay means therein including shiftable switch arms electrically interconnected to others by predetermined wiring means energizable other than all at the same time such that multiple electrical loads having a thermostatic element and the like in series with a line connection, and paralleled by an electromagnet coil of the relay means for each of the loads, the total of which for full energization simultaneously would exceed current rating of fuse or protector means in series with the source, can be used to energize the loads and maintain operation thereof in any predetermined groups of pairs totalling load current that will not result in functioning of the fuse means overload protector and the like unless there is an electrical failure and malfunctioning of one of the electrical loads.

Further objects and advantages of the present invention will be apparent from the drawings wherein preferred embodiments of the present invention will be shown.

Figure 1:
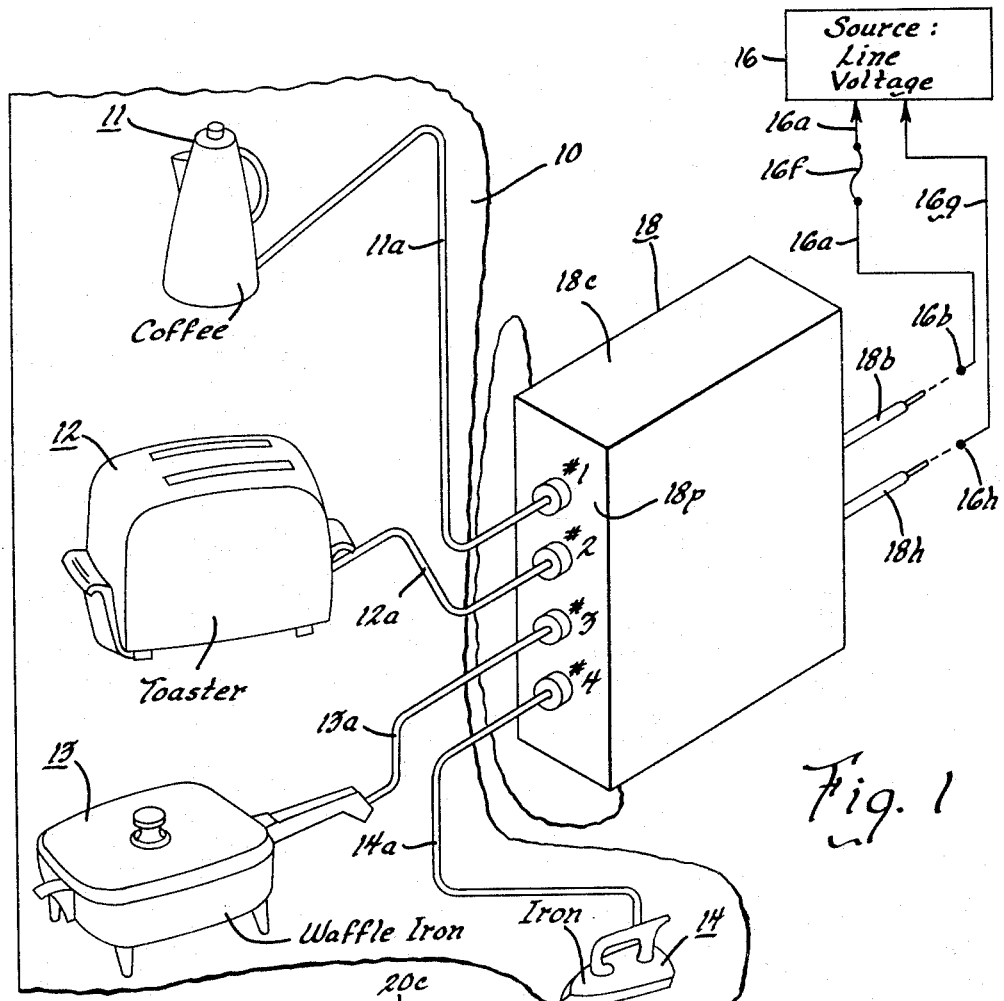
FIGURE 1 is a perspective view of multiple appliance loads connected to multiple power supply outlets of a control means, box portion, power distributor and the like in accordance with the present invention.

Fuse means, overload protectors and the like are generally adapted to interrupt a power connection through wiring means in a circuit as soon as a predetermined current rating is exceeded. Such interruption or breaking of the supply line assures prevention of fires due to overload currents in wiring means of a wall of a home for example. Also, such overload protection is adapted to minimize damage to appliances and to avoid injury due to shock or burning of any homemaker or appliance user to whom any electrical failure or malfunction can occur unexpectedly. Replacement of a fuse means as well as resetting of an overload protector and the like cannot be objectionable so long as an actual electrical failure or malfunction of an appliance is the cause of such occurrence.

In many instances however, there is actually no electrical failure or malfunction in any one of a number of multiple domestic appliances or electrical loads energized from a single source or power supply. Quite often a home or apartment house is provided with wiring means installed without anticipating recent increase in use of electrical appliances and consequent frequent inadvertent overloading of wiring means supplied from a single source can result in unnecessary expending of fuse means and overload protectors. In fact, a need exists particularly for protection of fuse means or overload protectors to assure against consummation thereof or actuation thereof due to any occurrence other than electrical failure such as short circuit or malfunctioning of a domestic appliance. Many homes and apartment houses built and wired electrically without any anticipation for present-day increased electrical power consumption due to increased use of electrical appliances cannot be rewired or provided with additional wiring outlets to accommodate increased use of electrical appliances. Cost of rewiring or provision of additional power outlets, as well as contractual agreements with respect to occupancy of an apartment house, can rule out any provision of adequate wiring to permit energization of all electrical appliances simultaneously at full load. Lack of knowledge of potential inadequacy so far as capability of supplying such full load through existing wiring means can result in unnecessary expense as to replacement and servicing of fuse means or overload protectors. Quit often homes and apartment houses when built were provided with a source of power at a voltage such as 110–120 volts and an individual circuit from this source of power depending upon size of wiring means is generally fused for a predetermined value such as 15 amperes and the like. Installation of a 220-volt supply line or additional outlets for existing power supply is not feasible for reasons indicated earlier and thus the present invention provides a solution for homemakers who can use various domestic appliances and energize these appliances from a single source fused at such a predetermined value, yet having at most only those appliances energized in pairs or otherwise simultaneously so as to avoid any unnecessary expenditure or inconveniences with respect to replacement or resetting of fuse means or overload protectors.

Since the common location for unnecessary overloading of a circuit is found in a kitchen of an apartment or home the present disclosure relates features of the present invention as to electrical loads such as a coffee maker, toaster, waffle iron and the like, as well as a stove or electric range energizable from one source of power such as 110–120 volts.

In FIGURE 1 there is indicated a work surface 10 such as on a table, counter top and the like in a suitable location such as a kitchen area. On this work surface 10 there can be provided an electrically operated coffee maker generally indicated by numeral 11, a toaster generally indicated by numeral 12 and electrically energizable, a waffle iron generally indicated by numeral 13 also electrically energizable, and a clothes pressing iron generally indicated by numeral 14 all to be heated with electrical energy from a single source of line voltage generally indicated by numeral 16. In series with one line 16a connectable to source 16 there is a fuse means 16f or overload protector means of any suitable type having a predetermined maximum load current rating such as 15 amperes and the like. A ground wire or second line 16g, together with the line 16a, can be installed relative to a home, apartment house and the like such that the lines are connected to suitable terminals 16b and 16h of a wall or floor outlet in a well-known manner. Generally one or two female sockets can be electrically connected to the terminals 16b and 16h but any further multiple loading thereof will result in a load current exceeding the predetermined value such as 15 amperes particularly when more than two domestic appliances such as the coffee maker 11 and toaster 12 as well as an additional appliance such as waffle iron 13 are energized. In accordance with the present invention there is shown in FIGURE 1 a control means, power distributor means, or power supply box portion generally indicated by numeral 18. This control means includes lead-in wires 18b and 18h adapted to be connected electrically to the terminal means 16b and 16h energized from the power source 16. The control means or power supply box portion 18 provides a plurality of electrical outlets represented as a plug-in panel or terminal board 18p. The power supply includes a container 18c that serves as a housing or body portion with a hollow interior in which a predetermined circuit such as illustrated in FIGURES 3 and 4 can be provided.

Figure 2:
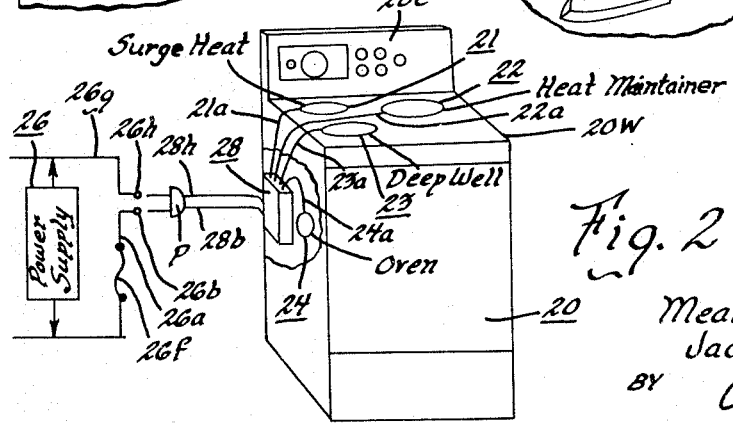
FIGURE 2 is a perspective view of a stove, electric range and the like diagrammatically including a power supply box portion for multi-load control of energization in accordance with the present invention.

FIGURE 2 illustrates a stove or electric range generally indicated by numeral 20 having a top portion or work surface 20w. The stove or electric range 20 can provide a mounting for various surface units or electrical loads including one for quickly attaining high heat for cooking indentifiable as "Surge-Heat" indicated generally by reference numeral 21, another identifiable as a "Heat-Maintainer" indicated generally by reference numeral 22 and that preheats and then automatically maintains a selected temperature thermostatically, a further unit identifiable as a "Deep Well" generally indicated by numeral 23 and that can be used for deep frying of foods such as French fried potatoes, shrimps and the like, as well as an oven unit generally indicated by numeral 24 and provided for baking, broiling and the like which can be set to attain and maintain a predetermined heat all in a predetermined sequence for preferential energization at most simultaneously in pairs. It is to be understood that suitable wiring means 11a, 12a, 13a, and 14a can be provided for interconnecting the appliances 11, 12, 13 and 14 respectively to the plug-in panel or terminal board of the control means 18 as well as wiring means 21a, 22a, 23a and 24a can be provided for establishing connection of the stove units 21, 22, 23 and 24 respectively to a power source or supply generally indicated by numeral 26 by way of a power supply box portion or control means generally indicated by numeral 28 and mounted or carried by the stove means or electric range 20 as indicated in FIGURE 2. Wiring means 28b and 28h establish electrical connection between a plug P and the control means 28 of the stove with respect to terminals 26b and 26h joined by wiring means 26g and 26a. Overload protector or fuse means 26f having a predetermined maximum load current value can be provided in series with the line or wiring means 26a with respect to the power supply 26, as indicated in FIGURE 2. It is to be noted that the stove or electric range 20 can have an integral control panel 20c adjacent to the top portion or work surface 20w. This control panel 20c can provide a mounting for instruments, timers, on-off switch means as well as indicator lights and the like. The timer can be used to provide an audible warning such as ringing of a bell upon expiration of a predetermined time interval and to alert a homemaker to the fact that a certain food or beverage being prepared has been allotted a sufficient time for heating to accomplish cooking and the like.

Figure 3:
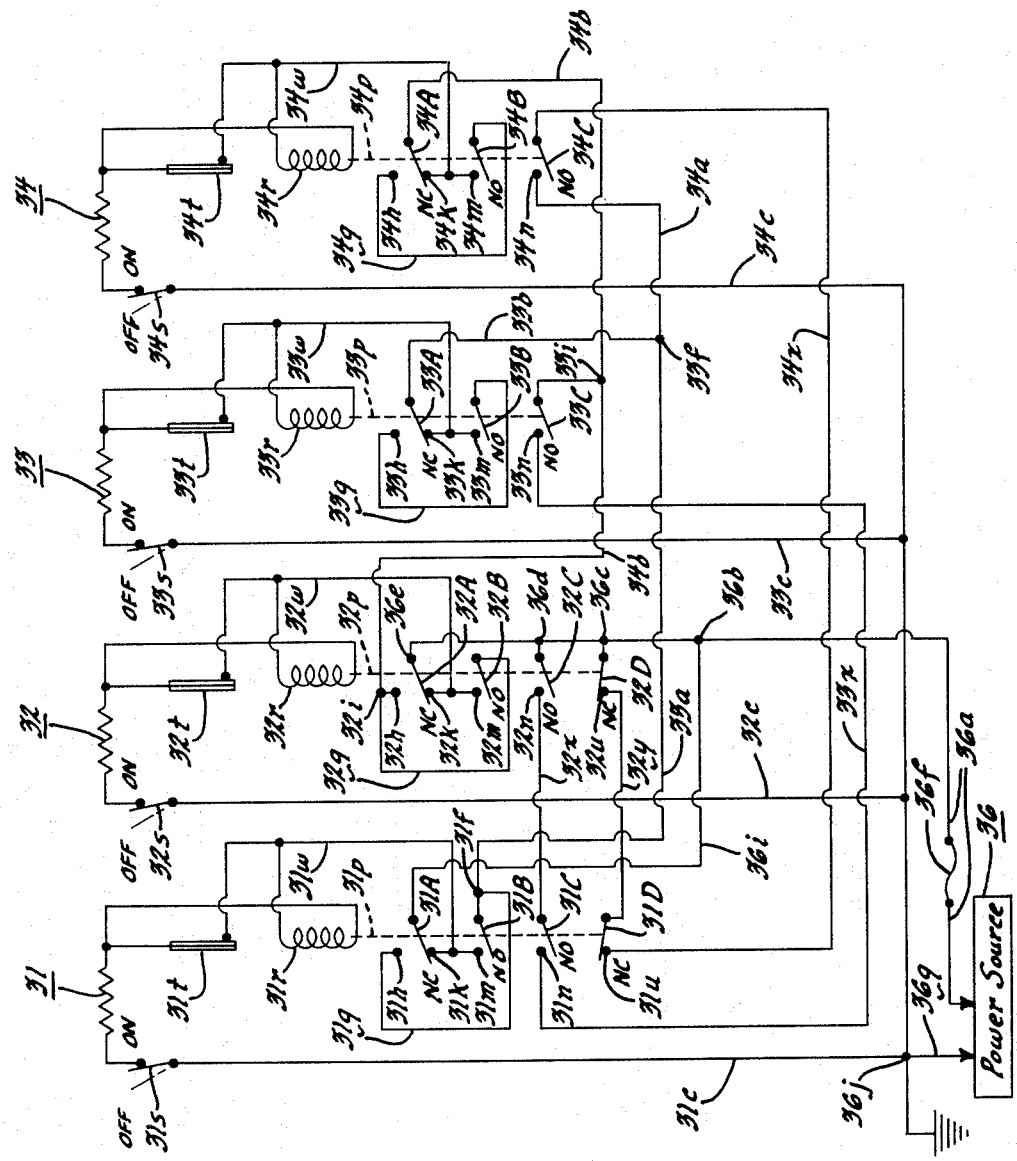
FIGURE 3 is a wiring diagram for a circuit to control energization of loads represented in FIGURES 1 and 2.
Figure 4:
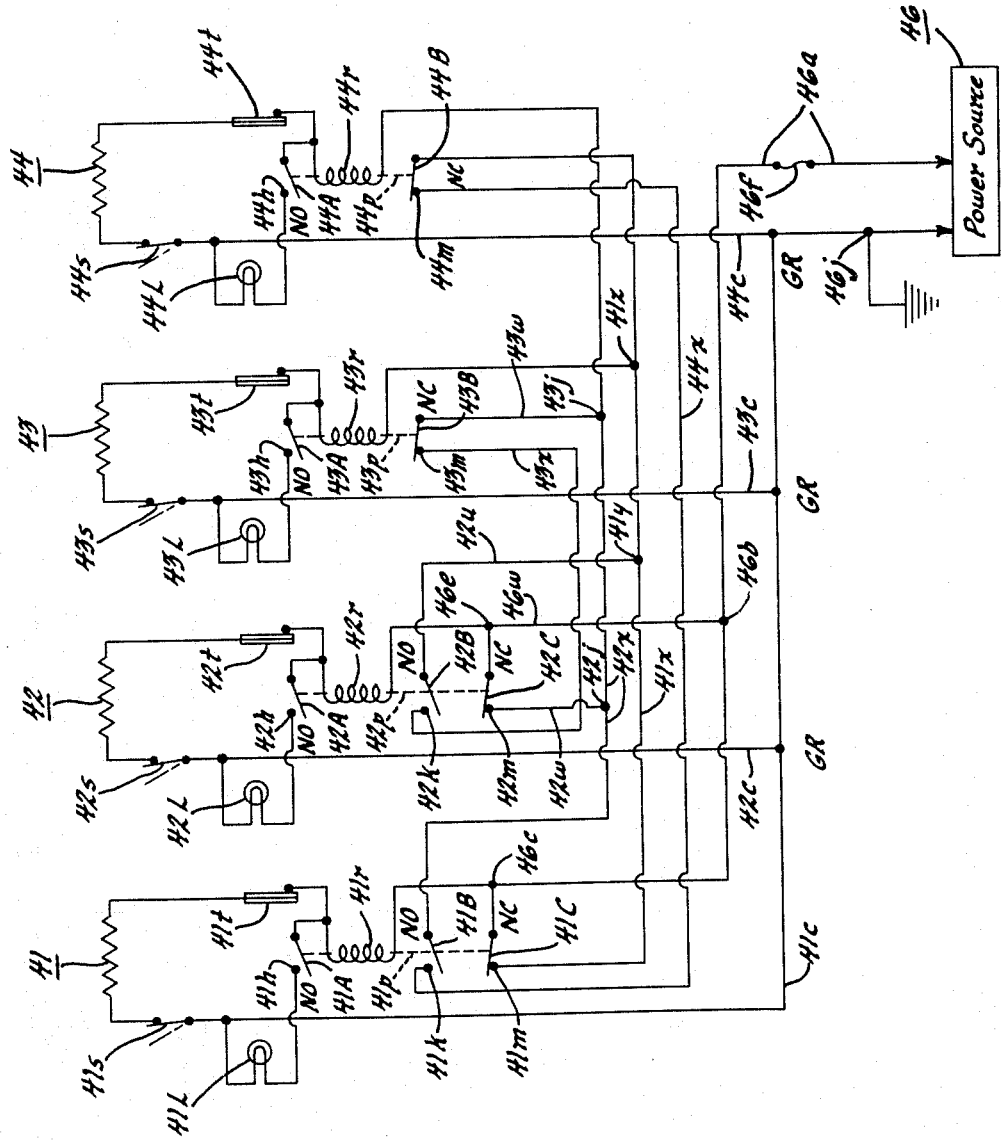
FIGURE 4 is a wiring diagram also for a circuit to control energization of loads represented in FIGURES 1 and 2.

A control circuit diagram of FIGURE 3 illustrates wiring means connections as well as relay means, switching means, necessary for preferentially energizing predetermined domestic appliances or electrical units thereof as identified by reference numerals 11, 12, 13 and 14 as well as 21, 22, 23 and 24 in FIGURES 1 and 2 respectively. The circuit arrangement of FIGURE 3 and components thereof can be fitted into power supply box portions such as 18 and 28. The domestic appliances or units of FIGURES 1 and 2 are represented as electrical loads identified generally by numerals 31, 32, 33 and 34 comparable to appliance loads identified by numerals 11, 12, 13 and 14 as well as 21, 22, 23 and 24 respectively. On-off switches 31s, 32s, 33s and 34s can be provided in series with each of these domestic appliances, electrical units or loads 31, 32, 33 and 34 respectively, as indicated in FIGURE 3. It is to be understood that these on-off switches 31s, 32s, 33s and 34s can be carried directly by appliances such as 11, 12, 13 and 14 or can be mounted on a control panel such as 20c or elsewhere on a stove or electric range such as 20. Also, particularly for appliances such as 11, 12, 13 and 14, it is possible that the on-off function accomplished by such switches can be the result of plugging in connector ends of wiring means such as 11a, 12a, 13a and 14a. This plugging in of the connector ends of these wiring means relative to terminal board or panel 18p, for example, is thus to be recognized as equivalent to having individual switching means for each of the appliances or surface units and the like mentioned earlier. Insulated conductors 31c, 32c, 33c and 34c interconnect one side of the appliances or loads 31, 32, 33 and 34 respectively to a common juncture such as 36j, grounded as indicated in FIGURE 3 and joined to a ground lead 36g to a power source or supply generally indicated by numeral 36.

In series with a power line or lead 36a there is an overload protector or fuse means 36f comparable to protectors or fuse means 16f and 26f of FIGURES 1 and 2 respectively. The line 36a supplies power to a plurality of junctures 36b, 36c, 36d and 36e. The control means circuit of FIGURE 3 includes electromagnetic switching means including potential relay coils 31r, 32r, 33r and 34r, opposite ends of which are connected to parallel thermostatic members, bimetallic switches, hot wire relays and the like identified by reference numerals 31t, 32t, 33t and 34t respectively. These thermostatic members 31t, 32t, 33t and 34t are in series with the appliance loads 31, 32, 33 and 34 respectively. The thermostatic members can be included as part of the appliance or surface unit circuit for each of the electrical loads and each is adapted to carry or be subject to heating of full load current for the various appliances or units represented by numerals 31, 32, 33 and 34.

Contacts of the thermostatic members 31t, 32t, 33t and 34t are normally closed until heating thereof ultimately results in flexing or displacement of bimetallic portions into a contact-open position in a well-known manner. So long as the thermostatic members 31t, 32t, 33t and 34t remain in closed contact circuit relationship these thermostatic members serve to shunt or short out the relay coils 31r, 32r, 33r and 34r which become energized in response to electrical potential across the thermostatic members as each thereof is caused to function into a contact-open position. The relay coils 31r, 32r, 33r and 34r are energizable to effect shifting or displacement of a magnetic core or plunger axially movable with respect to each of the coils and identified by numerals 31p, 32p, 33p and 34p respectively.

Each of the electromagnetic relay means having the relay coils 31r and 32r has a plurality of switch arms shiftable into predetermined positions in accordance with energization and actuation of plungers 31p and 32p respectively. Switch arms are also movable into predetermined positions in accordance with energization of relay coils 33r and 34r effective upon plungers 33p and 34p respectively. It is apparent in FIGURE 3 that four switch arms 31A, 31B, 31C and 31D as well as 32A, 32B, 32C and 32D are mechanically linked and movable in accordance with positioning of plungers 31p and 32p respectively. Thus a pair of electromagnetic relay means has one more switch arm than remaining electromagnetic switching means represented having only three switch arms such as 33A, 33B and 33C as well as 34A, 34B, and 34C mechanically linked and movable in accordance with positioning of plungers 33p and 34p respectively.

Power from the source 36 is supplied by way of line 36a to junction 36b and then to an intermediate connector or wiring means 36i that joins the junction 36b and the first switch arm 31A. Prior to energization of the relay coil 31r, the switch arm 31A is in a normally closed position to establish connection between the intermediate wiring means 36i and a contact 31k that is joined to a wire or conductor 31w in series with the thermostat or heat responsive means 31t to carry load current in series for the appliance or electrical unit 31.

Assuming that appliances or electrical loads 31, 32 and 33 are turned on simultaneously, it is to be noted that preference for energization is given to the appliances or electrical units 31 and 32. Power is supplied from juncture 36e directly to the switch arm 32A having a normally closed position in engagement with a contact 32k that is electrically connected to wire means 32w in series with the thermostatic element, hot wire relay and the like 32t in series with the appliance or electrical unit 32. Thus electrical load current is supplied to both the appliances or units 31 and 32, the total wattage of which requires a summation of load current that can be carried by the protector or fuse means 36f. For purposes of illustration, the coffee maker or percolator 11 can be said to have a rated wattage of 750 watts and that this coffee appliance represents the electrical load 31 in the circuit of FIGURE 3. Also, the toaster 12 in FIGURE 1 can be selected to have a 750-watt electrical resistance element which is plugged into the circuit and identifiable as the electrical load 32 in the circuit of FIGURE 3. Total power required for these two appliances is then twice 750 watts or 1500 watts total which, if supplied from a 110-volt source such as 16 and 36, will require less than the predetermined current rating such as 15 amperes for the protector or fuse means 16f, or 36f. However, selecting a waffle iron 13 with a power rating of 600 watts, for example, as the load or electrical unit 33 makes it apparent that the protector or fuse means 16f or 36f will be overloaded in the event a homemaker inadvertently or unknowingly plugs in this third appliance to obtain power from the 110-volt source. Similarly, selecting as a fourth electrical load or unit 34, the clothes iron 14 having a power rating of 800 watts will also result in overload and unnecessary operation or destruction of the protector or fuse means such as 16f or 36f.

Assuming that switches 33s and 34s are also in an "on" position or that the appliances representing the electrical loads 33 and 34 are plugged or connected to wiring outlets from the control means in accordance with the present invention, no power can be supplied by way of the switch arms 33A, 33B, as well as 33C and 34A, 34B, and 34C respectively due to normally closed and normally open positioning of the multiple switch arms operable in response to energization of the relay coils 31r and 32r respectively. The switch arm 31A remains in a normally closed position in engagement with the contact 31k and cannot move to engage a contact 31h until the thermostatic member 31t, the bimetal or hot wire of which is adapted to permit adequate heating of the resistance element 31 of an appliance such as the coffee maker 11 to a temperature required for coffee percolation at a predetermined heat level. Thus until the predetermined level of heating is attained in the coffee maker, for example, no power can be supplied by way of switch arm 31A to the contact 31h and a wire 31g connected to a juncture 31f. A supply wire 33a establishes electrical connection between this juncture 31f and a further juncture 33f to which there is connected an extension supply line 34a, as well as a lead line 33b connected to the switch arm 33A having a normally closed position in engagement with a contact 33k electrically connected to a wire 33w in series with the thermostatic means 33t and electrical load 33 or waffle iron 13 and the like. Thus until the switch arm 31A engages the contact 31h, there is no power supply to switch arm 33A or to the lead wire 34a. Also, no power can be supplied from the supply line 36a by way of the switch arm 32A until thermostatic member 32t has bimetal, hot wire and the like thereof displaced or deflected in response to heating as accomplished by load current in series therewith to the electrical unit or appliance 32 such as the toaster 12. The switch arm 32A has a normally closed position in engagement with the contact 32k. Only upon energization of the relay coil 32r does the plunger 32p effect shift of the switch arm 32a to establish an electrical connection across the junction 36e to a contact 32h that is electrically connected to an intermediate juncture 32i where a lead 32g as well as a supply line 34b are joined. This supply line 34b establishes an electrical connection between the juncture 32i relative to a tap-off point 33i in an intermediate location and to one end of a switch arm 31A pivotally mounted or journaled for normally closed engagement with a contact 34k. No power is supplied by way of supply line 34b to the contact 34k engaged normally by switch arm 34A to the supply wire 34w in series with the thermostatic means 34t and electrical load 34 such as the clothes iron 14, for example, unless heating of bimetal or hot wire and the like of the thermostatic member 32t has effected opening of the contact thereof to interrupt power supply to the electrical load 32 and energization of the potential relay coil 32r which will result in shifting of the plunger 32p for movement of the switch arm 32A from engagement with the contact 32k to the contact 32h.

Assuming now that the first appliance or electrical unit such as 31 taken as the coffee maker 11 for purposes of illustration, has attained a predetermined level of heating, the thermostatic means 31t opens a circuit of previous series connection to supply wire 31w whereupon the potential relay coil 31r is energized and effects magnetic shifting of the plunger 31p such that switch arm 31A establishes interconnection between the intermediate supply wire 36i and contact 31h as well as wire 31g. The switch arm 31B is moved from its normally open position into engagement with a contact 31m to insure preference in supply of power to the electrical unit or appliance 31 over any other appliance which may be plugged into or connected with the circuit of FIGURE 3. However, assuming that the level of heating of the electrical unit or appliance 31 remains at a predetermined level and the thermostatic member 31t remains in contact open position, then power can be supplied by way of switch arm 31A to the wire 31g and lead line 33a to the junction 33f and supply wire 33b to the switch arm 33A normally closed in engagement with contact 33k so as to supply wire 33w with power to the series-connected thermostatic member 33t and electrical load 33 or appliance such as the waffle iron 13.

Using the same power ratings noted earlier means that both the toaster and waffle iron requiring a total of 1350 watts can be safely supplied with power because total load current at 110 volts will be less than the predetermined maximum value of the rating of fuse means 36f. In the event the coffee maker or electrical load 31 cools below a predetermined level of heating governed by the thermostatic member 31t, the circuit is again closed due to closed contact with the supply wire 31w as effected by the thermostatic means 31t to assure instantaneous shorting of the potential relay coil 31r such that switch arm 31A returns to its normally closed position in engagement with contact 31k and switch arm 31B returns to its normally open position out of contact or engagement with respect to contact 31m. Thus, return of the switch arm 31A to a normally closed position in engagement with contact 31k interrupts power supply to the line 33a and the third appliance or electrical load 33 such as the waffle iron 13 becomes temporarily de-energized until a proper predetermined level of heating is re-established in the first electrical appliance such as 31 or 11.

Assuming now that with both the appliances 31 and 32 energized, both the appliances 33 and 34 have switches 33s and 34s in an "on" position. No power is supplied to appliances 33 and 34 until pre-empting of power supply is relinquished by either appliance 31 or appliance 32. Further assuming that the appliance 31 continues to require supply of electrical energy thereto, the switch arm 31A remains in electrical engagement with the contact 31k and switch arms 31B and 31C remain in normally open positions as illustrated. At this point the heating or supply of power to the second appliance 32 or toaster 12, for example, is no longer required and the thermostatic member 32t opens the series connection from the supply wire 32w. Thus power supply to the appliance or electrical load 32 is halted and potential relay coil 32r is energized so that plunger 32p effects shift of switch arms mechanically linked thereto. Switch arm 32A is now in engagement with the contact 32h so as to provide power supply from the line 36a and juncture 36e to the intermediate juncture 32i and supply wire 34b. Since the switch arm 34A is in a normally closed position and in engagement with contact 34k, power is supplied thereby to the supply wire 34w in series with the thermostatic member 34t and electrical load or appliance 34. At this instant of operation the appliances 31 and 34 are energized simultaneously for a total power requirement of 1550 watts using the watt ratings cited for purposes of illustration earlier. The protector or fuse means 36f can supply total load current from a 110-volt source such as 36 to meet the heating requirements of energization for these first and fourth appliances. Since the electrical appliance 31 is already energized and switch arm 31A is in normally closed position in engagement with the contact 31k, the power from appliance 32 can be readily diverted to appliance 34 by way of the supply line 34b. Energization of the potential relay coil 32r also effects movement of switch arm 32B from its normally open position into a closed contact position in engagement with contact 32m. Energization of the potential relay coil 32r also simultaneously effects movement of the switch arm 32C from its normally open position illustrated into a closed contact position in engagement with a contact 32n to which one end of a lead wire 32x is connected, an opposite end of the lead wire 32x being connected to one side of a switch arm 31C having a normally open position out of engagement with a contact 31n. Similarly, energization of the potential relay coil 32r effects shifting of contact arm 32D from a normally closed position in engagement with a bottom contact 32u electrically connected by a crossover wire or lead 32y connected at its opposite end to one side of switch arm 31D that is normally closed in a position in engagement with a contact 31u. The contact 31u is joined by a crossover lead 34x to one side of switch arm 34C having a normally open position out of engagement with contact 34n. The contact 31n has a lead wire 33x connected thereto at one end thereof and connected to a contact 33n at an opposite end thereof. The switch arm 33C has a normally open position out of engagement with the contact 33n. It is also noted that upon energization of the potential relay coil 33r, the plunger 33p is shifted together with the switch arms mechanically linked thereto such that switch 33A is removed from its normally closed position in engagement with contact 33k into engagement with a contact 33h joined by a wire 33g to one side of switch arm 33B that has a normally open position out of engagement with a contact 33m which is electrically connected to the supply wire 33w.

Similarly, upon energization of the potential relay coil 34r, the plunger 34p is shifted in position together with the switch arms mechanically linked thereto such that switch arm 34A is removed from its normally closed position in engagement with contact 34k into a position in engagement with a contact 34h joined by a wire 34g to one side of the switch arm 34B. The switch arm 34B has a normally open position out of engagement with a contact 34m which, if engaged, effects electrical connection to the supply wire 34w.

Assuming that the electrical appliance or load 34 has been energized and heated to a predetermined level at which the thermostatic member 34t effects opening of the circuit, the potential relay coil 34r becomes energized so as to have the plunger 34p mechanically linked to switch arms therewith effect shifting of these switch arms including the switch arm 34C. Closure of the circuit by engagement of switch arm 34C with contact 34n results in availability of power for appliance or electrical load 33 from juncture 36c by way of normally closed switch arm 32D and normally closed switch arm 31D when the appliances 31 and 32 are shut off, with the switches 31s and 32s in "off" open-circuit position.

Also, after energization sequentially of appliances 31, 32 and 33, the potential relay coils 31r, 32r and 33r will be energized as a predetermined level of heating is attained and maintained individually in these appliances by the thermostatic members 31*t*, 32*t* and 33*t* such that all three normally open switch arms 31C, 32C and 33C will be closed and in engagement with contacts 31*n*, 32*n* and 33*n* such that power can be supplied from juncture 36*d* by way of crossover lead 32*x* to the switch arm 31C and supply connector 33*x* to the switch arm 33C to intermediate juncture 33*i*. Power can be supplied from the intermediate juncture 33*i* by way of wiring means 34*b* and switch arm 34A to the supply wire 34*w* in the event power is required by turning on or plugging in the appliance. The tap-in relationship of the intermediate juncture 33*i* is such that in the event power is again called for by the appliance 32, load current can flow instantaneously by way of wire 34*b* to connector 34*g* and switch arm 32B to supply wire 32*w* connected to the thermostatic member 32*t* that can short out or shunt the potential relay coil 32*r*. After energization of the potential relay coil 33*r* the switch arm 33A normally closed in engagement with contact 33*k* is shifted into engagement with contact 33*h* and simultaneously normally open switch arm 33B is moved into engagement with contact 33*m*. Thus, assuming that at the same time the appliance 31 is also not calling for additional energy, the switch arm 31A is shifted by plunger 31*p* due to energization of potential relay coil 31*r* such that the arm 31A engages contact 31*h* and switch arm 31B that is normally open is shifted to engage contact 31*m*. Power can be supplied from the juncture 36*b* through switch arm 31A and wire 31*g* to the supply line 33*a* and lead 33*b* to switch arm 33A which engages contact 33*h* to close a circuit through line 33*g* and switch arm 33B to the supply wire 33*w* assuring maintenance of potential across relay coil 33*r* even when the thermostatic member 33*t* is in contact open condition. Each of the switch arms 31B, 32B, 33B and 34B can close to establish such potential with respect to relay coils 31*r*, 32*r*, 33*r* and 34*r* respectively to assure energization of the various potential relay coils in response to attainment of a predetermined level of heating for each of the various appliances. In the event that appliances 1, 2 and 3, so far as preference is concerned, or more particularly, appliances 31, 32 and 33 are not requiring additional energy for heating at a particular time, then the switch arms 31C, 32C, and 33C have all been shifted from their normally open positions into engagement with contacts 31*n*, 32*n*, 33*n* and supply of energy progresses through the switch arms 32C and 31C by way of supply line or crossover connector 33*x* and then through the switch arm 33C to the power line 34*b* by way of the intermediate tap-in juncture 33*i* and then to the switch arm 34A which is in a normally closed position due to closed condition of the thermostatic contact member 34*t*. In the event the appliance 31 requires additional energy, the thermostatic contact member 31*t* will close the series circuit connection to this appliance thereby again shorting out the potential relay coil and simultaneously causing switch arm 31C to return to its normally open position, thus to interrupt power supply to appliance number 34 which is not to receive energy in preference over energy requirements of appliance 31. However, in the event appliances 32 and 33 require no energy at this moment of operation, it is possible for the appliances 1 and 4 to receive energy simultaneously because switch arm 32A is moved by plunger 32*p* in response to energization of the potential relay coil 32*r* from a normally closed contact position in engagement with contact 32*k* into a position whereby switch arm 32A engages contact 32*h* that provides power or energy to the juncture 32*i* in an intermediate location and again energizes the supply line 34*b* connected with the switch arm 34A.

FIGURE 4 illustrates a wiring diagram also for a circuit to control energization of electrical loads such as those represented in FIGURES 1 and 2. Features of FIGURE 4 include a pilot light system and current relay means rather than potential relay coils such as 31*r*, 32*r*, 33*r* and 34*r* referred to in the description for FIGURE 3. The control circuit of FIGURE 4 can be built into the box portion such as 18 or 28 in FIGURES 1 and 2 respectively. As shown in FIGURE 4, current relay coils 41*r*, 42*r*, 43*r* and 44*r* are series connected to thermostatic members 41*t*, 42*t*, 43*t* and 44*t* respectively. Each of the thermostatic members includes a bimetal portion or hot wire relay contact structure adapted to have normally closed contacts but upon predetermined heating thereof to effect separation of these contacts and thereby to cause opening of a series circuit connection. A plurality of appliances or electrical units for an electric stove or electric range such as 20 referred to earlier in the description can be provided as connected in the circuit of FIGURE 4, as illustrated. Domestic appliances, electrical stove units, or electrical loads generally identified by numerals 41, 42, 43 and 44 can be provided in series with the thermostatic members 41*t*, 42*t*, 43*t* and 44*t*. These electrical loads 41, 42, 43 and 44 can be units installed in a top portion or work surface 20*w* of the stove of FIGURE 2, for example. The control panel of the stove identified by numeral 20*c* in FIGURE 2 can be wired to include switch means 41*s*, 42*s*, 43*s* and 44*s* in series with the electrical loads 41, 42, 43 and 44 respectively. Also, the control panel portion 20*c* of a domestic appliance such as the stove or even the box portion 18 can provide mounting for light-indicator means identified by numerals 41L, 42L, 43L and 44L energizable individually in accordance with energization or supply of power to the various electrical loads 41, 42, 43 and 44 respectively. A source of line voltage or power supply generally indicated by numeral 46 in FIGURE 4 can provide energization at a predetermined value of voltage such as 110–120 volts. A power supply line 46*a* has in series therewith an overload protector or fuse means 46*f* adapted to carry load current up to a predetermined value such as 15 amperes.

One of the advantages of the control means in accordance with the present invention is that at least a pair of electrical loads such as the coffee maker and toaster or coffee maker and waffle iron and the like can be energized preferentially. It is to be understood that the electrical loads identified by reference numerals 41, 42, 43 and 44 can be the appliances 11, 12, 13 and 14 respectively referred to earlier. Also the loads can be the electrical stove units 21, 22, 23 and 24 substituted for the loads 41, 42, 43 and 44 respectively. The control circuit of FIGURE 4 can be provided inside the box portion 18 or box portion 28 referred to in FIGURES 1 and 2. For purposes of illustration, the electrical load 41 can be taken as the "Surge-Heat" unit 21 to have a power rating of 800 watts. The electrical load 42 can be the "Heat-Maintainer" unit 22 substituted in the circuit of FIGURE 4 and having a power rating of 600 watts, for example. The electrical load 43 can be the "Deep Well" unit 23 having a power rating of 750 watts. Electrical load 44 for purposes of illustration will be cited as comparable to the oven unit 24 and having a power requirement of 750 watts, for example. It is to be noted that these wattage values are cited for purposes of illustration only but that total load current for any pair of the various loads energizable simultaneously will not exceed the predetermined total value of the fuse rating for fuse means 46*f* at a value such as 15 amperes supplied at a line voltage of 110–120 volts, for example. However, energization of three or more of these electrical loads 41, 42, 43 and 44 simultaneously would result in a total load current in excess of the fuse rating for fuse means 46*f*. Thus the control means of FIGURE 4 to operate in accordance with the present invention must allow energization of only two electrical outlets or appliances or units connected thereto at any one time. Power from supply line 46*a* passes through a first juncture or tap-in point 46*b* and then to a second juncture or tap-in point 46*c*. Common ground connections from each of the appliances or units to be energized can be provided by lead wires 41c, 42c, 43c and 44c connected to one side of the electrical loads 41, 42, 43 and 44 respectively. A ground juncture 46j is provided as shown in FIGURE 4. It is apparent that the electrical loads 41 and 42 can be simultaneously and immediately energized as they are plugged in or as the switches 41s and 42s respectively are in a circuit-closing or "on" position. Power can be supplied from the juncture 46c in series through the relay coil 41r, thermostatic member 41t and electrical load 41 until a predetermined level of heating is attained such that bimetal or hot wire means of the thermostatic member 41t effects an opening of a normally closed contact relationship thereof.

Assuming energization of the electrical load 41, there is corresponding energization of the series connected relay coil 41r such that a magnetic core or movable plunger 41p results in movement of multiple switch arms mechanically linked thereto. Plunger 41p is linked to switch arms 41A, 41B, and 41C. Similarly, the relay coil 42r, when energized, can effect movement of a magnetic core or plunger 42p mechanically linked to switch arms 42A, 42B, and 42C. Relay coil 43r, when energized, can effect movement or shifting of a magnetic core or plunger 43p mechanically linked to switch arms 43A and 43B.

Relay coil 44r, when energized, can effect movement or shifting of a magnetic core or plunger 44p mechanically linked to switch arms 44A and 44B.

Switch arm 41A, as well as switch arms 42A, 43A and 44A, when closed, are in engagement with contacts 41h, 42h, 43h and 44h respectively so as to close a circuit to parallel the indicator lamps 41L, 42L, 43L and 44L respectively connectable at one side to the ground conductors 41c, 42c, 43c and 44c respectively and at an opposite side to one side of relay coil means adapted to be energized in series with the respective electrical loads. Switch arms 41B and 42B are normally open and out of engagement or not in contact with contacts 41k and 42k respectively. Switch arms 41C, 42C, 43C and 44B have normally closed positions in engagement with contacts 41m, 42m, 43m and 44m.

Energization of the electrical loads 41 and 42 will result in simultaneous energization of series load current through the relay coils 41r and 42r. Thus, the switch arms 41A and 42A will close into engagement with the contacts 41h and 42h for energization of the indicator lamps 41L and 42L. Simultaneously, the switch arms 41B and 42B will move from their normally open position into a location in engagement with the contacts 41k and 42K. Switch arm 41C as well as switch arm 42C can move from their normally closed positions in engagement with the contacts 41m and 42m respectively, into an open circuit condition relative to these contacts. So long as the electrical loads 41 and 42 require preferential energization, the opening of the circuit connections relative to contacts 41m and 42m assures that electrical loads 43 and 44 cannot be energized even though they are plugged in or switches 43s and 44s are in a closed or "on" position in series with these loads 43 and 44. Only after the thermostatic member 41t has opened the series connection therethrough to load 41, will the relay coil 41r become deenergized so as to have switch arm 41B returned to a normally open position out of engagement with contact 41k and simultaneously to have switch arm 41C return to a normally closed condition in engagement with the contact 41m.

Assuming now that after energization of the loads 41 and 42, a condition arises wherein for the time being the requirements of load 41 are met. Load 42 continues to require energization but the thermostatic member 41t has opened the series circuit connection for energization of load 41 such that load 42 can be paired for energization with one load other than the satisfied load 41. Thus power can be supplied from juncture 46c through the switch arm 41C to contact 41m and by way of a cross-over lead 41x joined to junctures 41y and 41z. From the juncture 41z there is a direct connection to supply power to electrical load 43 in series with the thermostatic member 43t and the relay coil 43r. Energization of the relay coil 43r results in movement of plunger 43p mechanically linked to switch arms 43A and 43B such that the lamp or indicator 43L is energized and normally closed engagement of switch arm 43B relative to contact 43m is broken to open the circuit that would allow energization of the fourth load such as 44 by way of a cross-over lead 43x joined to contact 42k engaged by switch arm 42B connected to a connector or wire 42u. Thus energization of the relay coil 43r prevents supply of power to the electrical load 44 from juncture 41y to the connector 42u, switch arm 42B, contact 42k, cross-over lead 43x, contact lead 43m, switch arm 43B and then to a lead wire 43w connected between the switch arm 43B and a juncture 43j or tap-in connection relative to a cross-over lead 42x. The cross-over lead 42x extends from the switch arm 41B to the relay coil 44r and has an additional juncture 42j therein at a location intermediate the switch arm 41B and juncture 43j. Energization by way of juncture 42j from a wire 42w can occur only when the energization requirements for electrical load 42 are met and series power connected thereto by way of the thermostatic member 42t and relay coil 42r are interrupted upon operation of the bimetallic means of the thermostatic member 42t. Thus, only when the coil 42r is deenergized is the switch arm 42C in a circuit closing condition whereby power is supplied from juncture 46b to a wire 46w and a tap-in connection or juncture 46e through the switch arm 42C in engagement with the contact 42m. With the switch arm 42C in the normally closed condition relative to contact 42m, there is circuit continuity from the switch arm 42C by way of the wire 42w to the juncture 42j with the cross-over lead 42x such that power can be supplied directly to the relay coil 44r in series with the thermostatic member 44t and electrical load 44. Thus in a situation where the electrical loads 41 and 42 are not energized or require no further energization after being brought to a predetermined temperature level, it is possible to have the electrical loads 43 and 44 energized in pairs. As indicated earlier, the total load current requirement for any pair of electrical loads is such that predetermined capacity of fuse means 46f is not exceeded.

It is apparent that when the electrical load 41 is not being supplied with power, the switch arm 41B is in a normally open position relative to contact 41k and thus no power can be supplied from juncture 46e through the switch arm 42C in a normally closed position with contact 42m when the second electrical load 42 is also requiring no energization. In such circumstances, power goes from the juncture 42j directly to the relay coil 44r in series with the thermostatic member 44t and electrical load 44 such that the normally open condition of switch arm 44A terminates with engagement of the contact 44h for illumination of the lamp or indicator 44L simultaneously with opening or breaking of a normally closed contact engaging condition relative to the terminal or contact 44m. Assuming now that the bimetallic member 41t has cooled sufficiently to permit closure of series contacts for energization of the relay coil 41r and electrical load 41, there results a shifting of the plunger 41p such that switch arm 41C is separated from normally closed contact condition relative to the terminal or contact 41m thereby breaking supply of power from juncture 46c by way of the switch arm 41C to the cross-over lead 41x and juncture 41z to the relay coil 43r. Simultaneously upon energization of the relay coil 41r, the switch arm 41B is changed from its normally open condition into engagement with a contact 41k such that circuit continuity can exist from juncture 46e by way of switch arm 42C to the wire 42w through juncture 42j and cross-over wire 42x to the relay coil 44r for energization of electrical load 44 paired for simultaneous energization with electrical load 41. Energization of relay coil 44r results in breaking a normally closed condition between switch arm 44B and contact 44m such that a circuit by way of a crossover lead 44x is not completed even through switch arm 41B engages contact 41k. It is also to be noted that when the electrical load 41 requires no further energization, the switch arm 41C returns to a normally closed condition in engagement with contact 41m having crossover lead 41x connected thereto and extending to the switch arm 44B which so long as the relay coil 44r is energized is in a condition other than in normally closed engagement with contact 44m. So long as the electrical load 42 is deenergized, power can be supplied from the juncture 46e by way of switch arm 42C to junctures 42j and 43j to the relay coil 44r while power is also supplied from the juncture 46c by way of normally closed switch arm 41C in engagement with contact 41m which permits energization of the relay coil 43r by way of cross-over lead 41x to the junction 41z.

It is to be understood that the present invention represents a comprise as to available power for energization of predetermined loads only in pairs. It is realized that there is necessarily a division of the total available supply of energy, and thus it is possible that a slightly longer period of time will be required to reach and satisfy predetermined level of heating necessary for cooking, broiling, frying and the like as accomplished by the particular grouping of electrical loads. However, it is to be understood that the present invention overcomes unnecessary overload protector or fuse means dissipation due to inadvertent overloading of the same. Also, it is to be noted that in effect, there is a saving of time because replacement of fuses and resetting of overload protectors is completely avoided due to inadvertent overloading of a particular power supply. Thus, time is actually saved together with a conservation of fuse means.

Further details as to a suitable hot wire relay usable as the thermostatic members referred to in the foregoing description can be had by referring to a patent, 2,242,769, Werner. It is to be noted that no combination of electrical loads in pairs should exceed the predetermined current carrying capacity such as 15 amperes for the fuse means. The present invention assures preferential energization of at least one pair of electrical loads, and due to functioning of the thermostatic members, it is possible to shift back and forth into energization of various pairs of electrical loads according to which loads need additional energization or heating.

While the embodiments of the present invention as herein disclosed constitute preferred forms, it is to be understood that other forms might be adopted as may come within the scope of the claims as follows:

What is claimed is as follows:

1. A domestic appliance load preference circuit for use with an overload protector, fuse means and the like through which power is supplied comprising, a source of power at a predetermined voltage value such as 110–120 volts, fuse means in series with one line connection from said source and having load current capacity of predetermined value such as 15 amperes and the like, multiple electrical loads such as a coffee maker, toaster, waffle iron and the like having total load current in excess of the fuse means current capacity if all energized simultaneously from said same source yet having total load current only in pairs of loads of a value that can safely be coped with by said fuse means, a thermostatic means having a bimetal portion, hot wire and the like in series with each said electrical load, an electromagnetic relay means each including a relay coil energizable in response to predetermined series circuit closure for power supply to predetermined pairs of loads and plural switch arms provided by each relay means and movable in response to coil energization and de-energization so as to connect said power source and series fuse means only to a pair of electrical loads at a time until one thereof attains sufficient heating such that one of said thermostatic means effects opening of the power supply connection and said relay switch arms reconnect said power source to a further electrical load also energizable safely simultaneously in a pair with another of said loads.

2. A domestic appliance load preference circuit for use in a home, apartment house and the like where only a limited current and voltage supply is available and danger exists that inadvertently, unknowingly and the like multiple electrical loads will be turned on, plugged in and the like to require at once load current in excess of capacity of an overload protector fuse means and the like in series between the loads and the source comprising, a thermostatic means also in series with each of the loads and adapted to permit supply of predetermined load current thereto up to a limit of heating necessary to attain operating temperature and then to interrupt power supply thereto, an electromagnetic relay means having switch arms movable in response to energization thereof so as to divert power supply to other of said loads only in deference to at least a pair of said loads always energizable in preference to any remaining load combinations.

3. An electrical load connection control means for predetermined preferential energization of loads such as hot plates, frying pans, griddles, sandwich grilles, coffee makers, toasters, waffle irons, and the like comprising, a power supply having a predetermined maximum voltage rating, an overload protector fuse means in series with said power supply and having a capacity for only a predetermined total load current, a plurality of electrical loads connectable in parallel with each other and having total load current requirement if energized more than in pairs at a time to exceed capacity of said fuse means, multiple thermostatic means each having a bimetal portion and the like deformable in response to predetermined heating and series connected with each of said electrical loads, an electromagnetically operated switching means as well as wiring and conductors connected thereto to establish energization of only two of said loads at a time such that load current at any time of operation will never exceed the fuse means capacity even though said loads are plugged in, turned on and the like in series relative to said thermostatic means and said electromagnetically operated switch means.

4. An electrical load connection control means for predetermined preferential energization of loads such as surface units and an oven on an electric range and such as household appliances including coffee makers, toasters, waffle irons, clothes irons, hot plates, frying pans, griddles and the like comprising, a power supply having a predetermined maximum voltage rating, an overload protection fuse means in series with said power supply and having a capacity for only a predetermined total load current, a plurality of electrical loads connectable in parallel with each other and having total load current requirement if energized at more than in pairs at a time to exceed capacity of said fuse means, a bimetallic contact means in series with each of said loads, an indicator lamp means energizable in parallel across each said load and bimetallic contact means, separate multiple relay means including a current coil in series with each said load, bimetallic contact means, and said fuse means, a magnetic core-like plunger movable in response to coil energization and plural switch arms mechanically linked to each plunger, at least one of the first two of said relay means having one switch arm more than at least one of any remaining relay means and having a normally closed contact-engaging positioning such that any electrical load other than a preferentially energized first pair of loads is energized upon satisfying minimum heating demand for either of the preferentially energized first pair of loads.

5. On a household appliance such as a stove, electric range, and the like an electrical load connection control means comprising, a power supply box portion mounted in a predetermined location on the appliance having therewith an electrical circuit including line connections to a main source of power, overload protector fuse means provided in series with one of the line connections and having load current capacity of predetermined maximum value, a plurality of electrical loads connectable in parallel with each other and having total load current requirement if energized at more than in pairs at a time to exceed capacity of said fuse means, separate thermostatic members in series with each of said loads, separate multiple relay means including a current coil in series with each said load and thermostatic member, a magnetic core-like plunger movable in response to coil energization and plural switch arms mechanically linked to each plunger, a first pair of said relay means each having one switch arm more than any remaining relay means, said first pair of said relay means each having at least one switch arm open and out of engagement with a contact and another switch arm closed in engagement with another contact each to permit crossover connection to any remaining relay means only in the event one of said first pair of relay means has the series-connected coil thereof de-energized, any electrical load other than the preferentially energized first pair being energizable only after one of the first pair of loads fails to call for energization as well as fails to demand further energization due to opening of series connection thereto by said relay means having the current coil in series therewith.

6. For a home, apartment house and the like having a 110–120 volt power supply protected by a single fuse means in series with a connection thereto and having a predetermined total maximum load current capacity such as 15 amperes and the like, an electrical load connection control means comprising, a power supply box portion mounted adjacent to a work surface on which domestic appliance means such as a coffee maker, toaster, waffle iron and the like as well as a frying pan, griddle, hot plate and the like are located, a plug-in-panel terminal board provided by said power supply box portion and having therewith an electrical circuit including line connections to the power supply, a plurality of electrical loads connectable in parallel with each other and having total load requirement if all energized simultaneously in excess of fuse means current capacity, separate thermostatic means including a bimetal portion and the like in series with each load and adapted to open circuit connection thereto upon predetermined load current heating of the bimetal portion, separate multiswitch-arm relay means including a current coil in series with each said load and thermostatic means, a first pair of said relay means each having one switch arm more than any remaining relay means, said first pair of said relay means each having at least one switch arm open and out of engagement with a contact and another switch arm closed in engagement with another contact each to permit crossover connection to any remaining relay means only in the event one of said first pair of relay means has the series-connected coil thereof de-energized, any electrical load other than the preferentially energized first pair being energizable only after one of the first pair of loads fails to call for energization as well as fails to demand further energization due to opening of series connection thereto by said relay means having the relay coil in series therewith, said loads in any combination of pairs having a summation of load current requirement within the current carrying capacity of the fuse means.

7. In combination, a plurality of domestic-appliance electrical loads such as a coffee maker, toaster, waffle iron, griddle, frying pan and the like the total load current requirement of which if energized three and more at a time exceeds a predetermined maximum value such as 15 amperes, and an electrical load connection control means for predetermined preferential energization of said loads and including a power supply having a predetermined maximum voltage rating such as 110–120 volts, an overload protection fuse means in series with said power supply and having a capacity for only predetermined total load current such as 15 amperes, a bimetallic contact means in series with each of said loads, electromagnetic relay means having a multiswitch-arm portion as well as a relay coil portion energizable and de-energizable for switch-arm movement in accordance with opening and closing of series circuit connection in response to load current heating of said bimetallic contact means, a first pair of said relay means each having one switch arm more than any remaining relay means and each having at least one switch arm open and out of engagement with a contact and another switch arm closed in engagement with another contact each to permit crossover connection of said power supply to any remaining relay means only in the event one of said first pair of relay means has established switch-arm connections in response to sufficient heating of one load and bimetallic contact means in series therewith such that energizing condition of said relay coil can effect switch-arm movement for energization of any less preferential load next in condition therefor.

8. The combination of claim 7 wherein said relay coils are connected in parallel across said bimetallic contact means for energization and actuation of said relay means in accordance with potential across said bimetallic contact means.

9. In combination, an electric stove, range and the like having an oven as well as surface cooking units each energizable as an electrical load the total load current requirement of which if energized three and more at a time exceeds a predetermined maximum value such as 15 amperes and the like, and an electrical load connection control means for predetermined preferential energization of said loads and including a power supply having a predetermined maximum voltage rating such as 110–120 volts, an overload protection fuse means in series with said power supply and having a capacity for only predetermined total load current such as 15 amperes and the like, a bimetallic contact means in series with each of said loads, electromagnetic relay means having a multiswitch-arm portion as well as a relay coil portion energizable and de-energizable for switch-arm movement in accordance with opening and closing of series circuit connection in response to load current heating of said bimetallic contact means, an indicator lamp means energizable and parallel across each said load and bimetallic contact means, each relay means having a switch arm for closing circuit connection to said indicator lamp means simultaneously with corresponding energization of one of said loads in accordance with opening and closing of series circuit connection in response to load current heating of said bimetallic contact means, a first pair of said relay means each having one switch arm more than any remaining relay means and each having at least one switch arm open and out of engagement with a contact and another switch arm closed in engagement with another contact each to permit crossover connection of said power supply to any remaining relay means in the event one of said first pair of relay means is free of preferential energization of the electrical load therewith, said loads only in any combination of pairs having load current requirements within capacity of said fuse means.

No references cited.